United States Patent [19]

Shigeno

[11] 3,956,813
[45] May 18, 1976

[54] SLIDER HOLDER FOR THE ASSEMBLAGE OF SLIDE FASTENERS
[75] Inventor: Shunichi Shigeno, Kurobe, Japan
[73] Assignee: Yoshida Kogyo Kabushiki Kaisha, Japan
[22] Filed: Dec. 16, 1974
[21] Appl. No.: 532,846

[30] Foreign Application Priority Data
Dec. 19, 1973 Japan............... 48-142728

[52] U.S. Cl. ............. 29/207.5 SL; 269/159; 269/254 R
[51] Int. Cl.² ......................... B21D 53/50
[58] Field of Search ........... 29/207.5 R, 207.5 ST, 29/207.5 SL, 207.5 D; 269/157, 159, 254 R

[56] References Cited
UNITED STATES PATENTS

| 985,209 | 2/1911 | Russell | 269/157 |
|---|---|---|---|
| 3,812,571 | 5/1974 | Dori | 29/207.5 SL |
| 3,844,014 | 10/1974 | Takahashi | 29/207.5 SL |
| 3,844,016 | 10/1974 | Kawakami | 29/207.5 SL |

Primary Examiner—Harold D. Whitehead
Attorney, Agent, or Firm—Bucknam and Archer

[57] ABSTRACT

A slider rest is formed on the top of a hollow, generally upright support structure or frame for holding a slider thereon in upside-down disposition with its pull tab telescopically received in a slit extending downwardly from the slider rest. Accommodated within the support structure is a pivotable locking lever having an offset detent at its top end which is movable into and out of engagement with an aperture in the slider pull tab received in the slit. Normally, the locking lever is held in its inoperative position by a retractable stop extending across the slit. Upon insertion of the slider pull tab into the slit, the retractable stop is thereby pivoted downwardly to permit the locking lever to be spring-actuated to its operative position where the detent engages the pull tab aperture and thus locks the slider on the slider rest.

3 Claims, 5 Drawing Figures

SLIDER HOLDER FOR THE ASSEMBLAGE OF SLIDE FASTENERS

BACKGROUND OF THE INVENTION

This invention relates generally to the art of slide fastener manufacture, and more specifically to a device for holding a slider for the assemblage therethrough of a pair of slide fastener stringers. The device, herein termed a slider holder, is designed in particular to hold sliders for the assemblage therethrough of slide fastener stringers which have been attached to desired parts of garments or other articles.

Slider holders heretofore developed and used in the industry for the above mentioned purpose usually include a locking lever which is adapted to releasably engage the pull tab of each slider to lock the same in a prescribed assembly position on the device. The locking lever yieldingly pivots between its slider locking and unlocking positions as each slider is manipulated onto and away from the assembly position. According to this prior art construction the slider is often locked rather insecurely. Thus, as a pair of stringers already attached to an article are threaded through the channeled body of the slider locked on the prior art slider holder, the slider tends to shake or, worse yet, to be detached altogether from the holder due to the weight of the article.

SUMMARY OF THE INVENTION

It is an object of this invention to provide a slider holder for holding a slider for the assemblage of slide fastener stringers therethrough, such that the slider can be positively locked practically against any possibility of displacement or detachment.

Another object of the invention is to provide a slider holder which permits the successive sliders to be readily mounted on and withdrawn from a predetermined assembly position on the holder, so that the assemblage of stringers through the sliders can be performed highly expeditiously.

With these objects in view and the other objects hereinafter set forth, this invention contemplates the provision of a slider holder including a hollow support structure having a slider rest on its top and a slit extending downwardly therefrom to telescopically receive the pull tab of a slider when the same is mounted upside down on the slider rest. A locking lever having a detent at its top end is pivotally mounted within the support structure and is biased by first spring means so that the detent tends to project into an aperture in the slider pull tab received in the slit. Also pivotally mounted within the support structure is a retractable stop which, when there is no slider mounted on the slider rest, extends across the slit to engage and retain the locking lever in its inoperative position. Thus, when the slider pull tab is fully inserted into the slit, the stop pivots downwardly to its retracted position against the force of second spring means, thereby disengaging the locking lever. The detent of the locking lever thus projects into the pull tab aperture to lock the slider on the slider rest.

According to the improved slider holder outlined in the foregoing, the nearly complete locking of the slider on the slider rest is possible merely by increasing the pressure exerted on the locking lever by the first spring means. For the withdrawal of the slider from the slider rest following the assemblage of slide fastener stringers therethrough, the locking lever may be turned, either manually or mechanically, to cause the detent to move out of the pull tab aperture.

The features which are believed to be novel and characteristic of this invention are set forth in particular in the claims appended hereto. The invention itself, however, both as to its construction and mode of operation, together with the further objects and advantages thereof, will become apparent in the course of the following description read in connection with the accompanying drawings in which some preferred embodiments of the invention are disclosed, and in which like reference characters denote corresponding parts of the several views.

DESCRIPTION OF THE PREFERRED EMBODIMENTS

Figure 1:
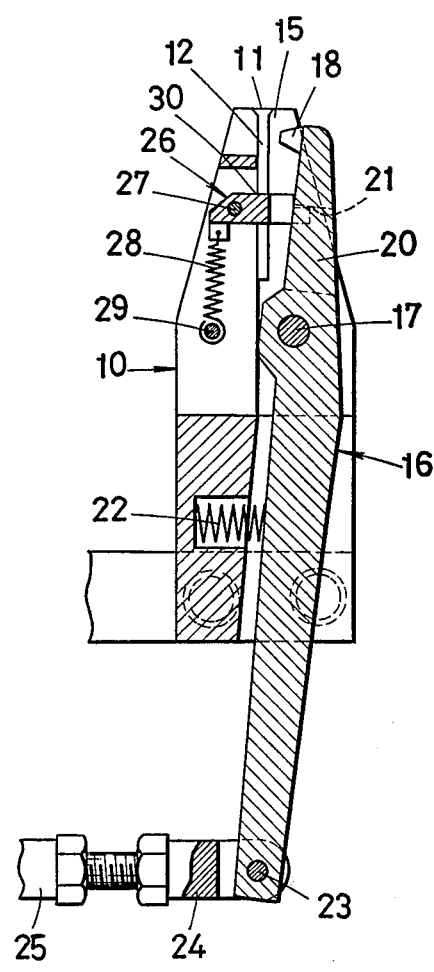
FIG. 1 is a vertical sectional view of a slider holder constructed in accordance with the novel concepts of this invention, the slider holder being shown in its normal state.
Figure 2:
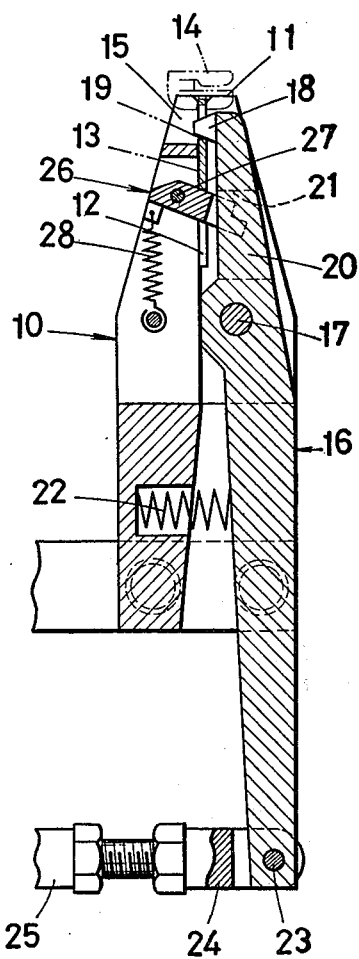
FIG. 2 is a view similar to FIG. 1 but showing the slider holder in a state when a slider is locked in position thereon.
Figure 3:
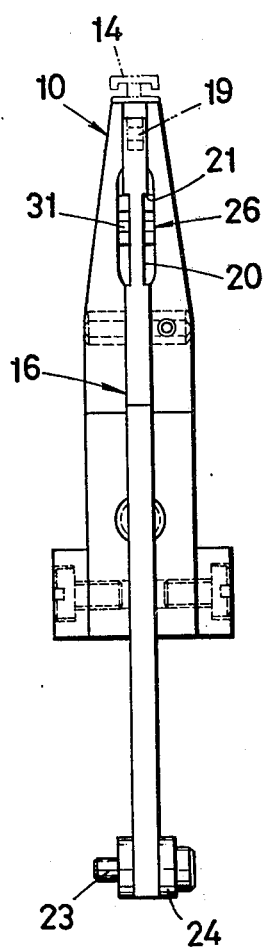
FIG. 3 is the right hand side elevational view of the slider holder shown in FIGS. 1 and 2.

With reference to FIGS. 1 to 3, the slider holder illustrated therein by way of a preferred embodiment of this invention includes a generally upright support structure or frame 10 having a slider rest 11 formed on its top. A slit 12 extends vertically downwardly from the top of the support structure 10 to telescopically receive the pull tab 13 attached to the usual channeled body of a slider 14 as the latter is mounted in upside-down disposition on the slider rest 11. A hollow 15 also extends vertically through the support structure 10 in generally crosswise arrangement with the slit 12.

Accommodated in the hollow 15 of the support structure 10, on one side of the slit 12, is a locking lever 16 which is pivotally supported at its mid-portion on a pivot pin 17 extending between, and supported by, the confronting side walls of the support structure. The locking lever 16 has a tapering detent 18 formed at its top end in offset relationship to the major portion of the lever, which detent is adapted to be thrusted into and out of an aperture 19 in the pull tab 13 of the slider 14 mounted in position on the slider rest 11.

Figure 4:
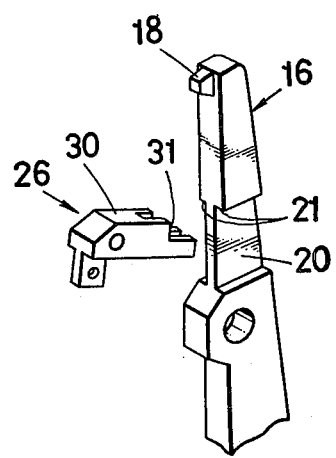
FIG. 4 is a partial, perspective detail view of a locking lever and a retractable stop in the slider holder shown in FIGS. 1 to 3.

As best illustrated in FIG. 4, the locking lever 16 has a portion 20 of reduced thickness above the pivot pin 17. The reduced thickness portion 20 defines a pair of horizontally registered steps 21 on both lateral faces of the locking lever 16, for purposes hereinafter made apparent.

Referring again to FIGS. 1 to 3, a helical compression spring 22 is mounted within the support structure 10 to bias the locking lever 16 counterlockwise, as viewed in FIGS. 1 and 2, about the pivot pin 17, so that the detent 18 at the top end of the locking lever tends to project into the aperture 19 in the slider pull tab 13. The locking lever 16 includes a portion projecting downwardly of the support structure 10, and the bottom end of the locking lever is operatively coupled, as through a pin 23 and a link 24, to the plunger of a solenoid or to some such linearly reciprocating mechanism of well known construction generally indicated by the numeral 25. The linearly reciprocating mechanism 25 is intended for use when the detent 18 at the top end of the locking lever 16 is to be retracted out of the aperture 19 in the slider pull tab 13, that is, when the locking lever is to be turned relative to the support structure 10 from its operative position shown in FIG. 2 to its inoperative position shown in FIG. 1 against the bias of the compression spring 22. It is to be understood, however, that the linearly reciprocating mechanism 25 can be dispensed with, as the locking lever 16 can be manually turned from its operative to inoperative position.

The reference numeral 26 designates a retractable stop for holding the locking lever 16 in its inoperative position. The retractable stop 26 is pivotally supported at 27 in the hollow 15 of the support structure 10 in opposed relationship to the reduced thickness portion 20 of the locking lever 16. A helical tension spring 28 extends between one end of the retractable stop 26 and a pin 29. Normally, that is, when the slider 14 is not mounted on the slider rest 11, the retractable stop 26 is urged by the tension spring 28 to engage and retain the locking lever 16 in its inoperative position shown in FIG. 1.

It is to be noted that when in its normal position shown in FIG. 1, the retractable stop 26 extends substantially horizontally across the slit 12, with the top surface 30 of the stop disposed suitably higher than the bottom edge of the slider pull tab 13 fully inserted into the slit. The other end of the retractable stop 26 is bifurcated and further recessed at 31 to releasably engage the steps 21 of the locking lever 16 when the latter is in its inoperative position, as will be best understood from a consideration of FIG. 4.

In operation, it is now assumed that the pull tab 13 of the slider 14 is inserted into the slit 12 while the various working parts of the illustrated slider holder are in their normal or inoperative positions shown in FIG. 1. As the channeled body of the slider 14 is forced down fully onto the slider rest 11, the bottom edge of the slider pull tab 13 riding on the top surface 30 of the retractable stop 26 causes the latter to turn clockwise, as viewed in FIGS. 1 and 2, against the force of the tension spring 28.

Thereupon the retractable stop 26 disengages the locking lever 16 to permit the same to be turned counterclockwise by the compression spring 22, as will be seen from FIG. 2. The detent 18 at the top end of the locking lever 16 thus projects into and through the aperture 19 in the slider pull tab 13, so that the slider 14 is now securely locked in position on the slider rest 11, ready for the assemblage of slide fastener stringers therethrough.

Upon completion of the assemblage of the slide fastener stringers through the slider 14, the locking lever 16 may be turned to its inoperative position by exerting pressure on its projecting bottom end, either manually or by the linearly reciprocating mechanism 25, against the bias of the compression spring 22. With the detent 18 at the top end of the locking lever 16 thus retracted out of the aperture 19 in the slider pull tab 13, the slider 14 is readily withdrawable from the slider rest 11 together with the attached slide fastener stringers.

As the detent 18 of the locking lever 16 retracts out of the aperture 19 in the slider pull tab 13 as aforesaid, the retractable stop 26 is turned by the tension spring 28 to its initial position shown in FIG. 1, where the stop again engages and retains the locking lever in the inoperative position. The next slider may now be mounted and locked on the slider rest 11 may now be mounted and locked on the slider rest 11 through exactly the same procedure as that set forth above.

Figure 5:
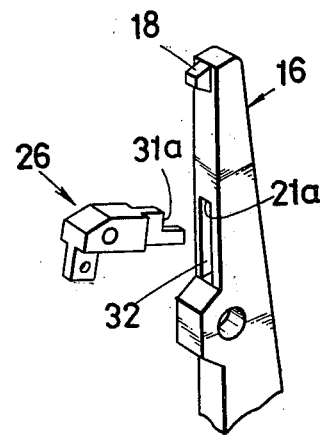
FIG. 5 is a view similar to FIG. 4 but showing a modified example of the slider holder.

FIG. 5 illustrates a slight modification of the preceding embodiment, in which the locking lever 16 has a vertical or longitudinal slot 32 in place of the reduced thickness portion 20 shown in FIG. 4. The opposed end of the retractable stop 26 is not bifurcated as in the preceding embodiment but is narrowed in width to slidably fit in the slot 32 in the locking lever 16. The narrowed end of the retractable stop 26 has a recess 31a adapted to engage the upper edge 21a of the slot 32 and hence to retain the locking lever 16 in its inoperative position shown in FIG. 1. Other details of construction and operation follow suit after those previously explained in connection with FIGS. 1 to 4.

As may have been understood from the foregoing description, the improved slider holder according to the invention permits successive sliders to be readily mounted on and withdrawn from the slider rest 11 merely by mechanically or manually actuating the locking lever 16 from its operative to inoperative position. This actuation of the locking lever is necessary only once for each slider mounted on and withdrawn from the slider rest, because the movement of the locking lever from its inoperative to operative position is effected automatically as the slider is forced down fully onto the slider rest. The nearly complete locking of the slider on the slider rest is also possible if the compression spring 22 is of sufficient force. It will therefore be appreciated that the assemblage of slide fastener stringers through the successive sliders can be accomplished highly efficiently by use of the improved slider holder according to the invention.

While the invention has been shown and described hereinbefore in terms of specific embodiments thereof, it is to be clearly understood that all matter described herein or shown in the accompanying drawings is by way of example only and is not intended to impose limitations upon the invention. It is therefore appropriate that the invention be construed broadly and in a manner consistent with the fair meaning or proper scope of the following claims.

What is claimed is:

1. A device for holding a slider for the assemblage of slide fastener stringers therethrough, wherein said slider includes a pull tab having an aperture therein, said device comprising, in combination, a hollow support structure having a slider rest on its top and a slit extending downwardly therefrom to telescopically receive said pull tab of said slider when the same is placed upside down on said slider rest, a locking lever mounted within said support structure so as to be pivotable between a first and a second position, said locking lever having a detent at its top end which is adapted to engage said aperture in said pull tab telescopically received in said slit when said locking lever is in said first position and to disengage said aperture when said locking lever is in said second position, first spring means biasing said locking lever toward said first position, a retractable stop mounted within said support structure so as to be pivotable between a blocking position, where said retractable stop extends across said slit to engage and retain said locking lever in said second position, and a release position where said retractable stop disengages said locking lever to permit the latter to be pivoted to said first position by said first spring means, and second spring means biasing said retractable stop toward said blocking position, said retractable stop being disposed for engagement by the pull tab of said slider and for pivotal movement by the insertion of said pull tab into said slit, from said blocking position to said release position against the bias of said second spring means to permit the detent of the locking to engage the pull tab by extending into the aperture thereof.

2. The device as recited in claim 1, wherein said locking lever includes a portion projecting downwardly of said support structure, said downwardly projecting portion being intended for use when said locking lever is to be pivoted from said first to said second position.

3. The device as recited in claim 2, including a linearly reciprocating mechanism operatively coupled to the bottom end of said downwardly projecting portion of said locking lever.

* * * * *